US007872634B2

(12) United States Patent
Lin et al.

(10) Patent No.: US 7,872,634 B2
(45) Date of Patent: Jan. 18, 2011

(54) STATUS SENSING MECHANISM AND THE CURSOR-CONTROL DEVICE APPLYING THE SAME

(75) Inventors: Hsuan-Li Lin, Kaohsiung (TW); Chin-Lin Hsieh, Banqiao (TW); Chi-Lianq Chen, Fengshan (TW); Shun-Nan Liou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1176 days.

(21) Appl. No.: 11/512,403

(22) Filed: Aug. 30, 2006

(65) Prior Publication Data

US 2007/0132728 A1 Jun. 14, 2007

(30) Foreign Application Priority Data

Dec. 14, 2005 (TW) .............................. 94144192 A

(51) Int. Cl.
G09G 5/00 (2006.01)
(52) U.S. Cl. ........................ 345/156; 345/157; 345/161; 345/163
(58) Field of Classification Search ......... 345/156–157, 345/161, 163
See application file for complete search history.

(56) References Cited

U.S. PATENT DOCUMENTS

| 6,342,878 | B1 * | 1/2002 | Chevassus et al. .......... 345/158 |
| 7,050,102 | B1 * | 5/2006 | Vincent ................. 348/333.02 |
| 2005/0231475 | A1 * | 10/2005 | Law et al. ................... 345/161 |

2006/0256085 A1 * 11/2006 Tsai et al. .................... 345/163

FOREIGN PATENT DOCUMENTS

| CN | 1236129 | 11/1999 |
| JP | 10254620 | 9/1998 |
| JP | 2001142636 | 5/2001 |
| JP | 2002073269 | 3/2002 |

* cited by examiner

Primary Examiner—Amr Awad
Assistant Examiner—Leonid Shapiro
(74) Attorney, Agent, or Firm—WPAT., P.C.; Justin King

(57) ABSTRACT

A status sensing mechanism is disclosed, which comprises: a post, and a sleeve, ensheathing the post for enabling the post to slide up and down therein; wherein the post is abutted against a side of the sleeve as the inertial cursor-control device is subject to a first movement while the post is separated from the side of the sleeve as the inertial cursor-control device is subject to a second movement. By the use of the aforesaid status sensing mechanism, an improved cursor-control device can be provided, in which a sensor is used to detect and determine whether the status sensing mechanism is subjecting to the first movement or the second movement so as to issue different electrical signals corresponding to the detection to an inertial cursor processor arranged inside the cursor-control device for directing the inertial cursor processor to perform one of the following operation: (1) to perform a two-dimensional or three-dimension operation with respect to the received electrical signal for controlling the switching of the sensing capabilities of the cursor-control device, that is, the cursor-control device is controlled to be in a mode of two-dimensional detection or in a mode of three-dimensional detection; and (2) to perform either a displacement locking operation for freeing the cursor from the control of the cursor-control device, or a calculation of displacement for directing the cursor to move accordingly.

18 Claims, 5 Drawing Sheets

STATUS SENSING MECHANISM AND THE CURSOR-CONTROL DEVICE APPLYING THE SAME

FIELD OF THE INVENTION

The present invention relates to a status sensing mechanism and the inertial cursor-control device applying the same, and more particularly, to a status sensing mechanism arranged in an inertial cursor-control device for detecting and determining the operation of the inertial cursor-control device.

BACKGROUND OF THE INVENTION

Currently, there are many kinds of computer mouse available on the market, which are the most popular human-machine interface used by computers as cursor-control device. Most of computer mice are only operable on a planar surface, such as a desk-top, and are generally to be an optical mouse. There are two most common types of optical mice available nowadays, which are LED optical mouse and laser mouse with respect to the different means of detection. A typical LED optical mouse has a small, red light-emitting diode (LED) that bounces light off that surface with sufficient roughness onto a complimentary metal-oxide semiconductor (CMOS) sensor. The CMOS sensor sends each image to a digital signal processor (DSP) for analysis, that the DSP is able to detect patterns of shadows generated by the roughness of the surface in the images and see how those patterns have moved since the previous image. Based on the change in patterns over a sequence of images, the DSP determines how far the mouse has moved and sends the corresponding coordinates to the computer. However, if the working surface of the LED optical mouse is a smooth surface made of marble, tile, or metal, etc., such mouse might not be able to operate without a hitch. A laser mouse is an advanced optical mouse, which is capable of emitting a coherent light so as to detect more surface pattern variation than the standard LED based optical mice. Nevertheless, such laser mice are not able to operate fluently while working on a transparent surface made of glass, acrylic, and so on.

With respect to the shortcomings of optical mice, inertial cursor-control devices, such as the inertial mouse disclosed in T.W. Pat No. 526975, are gradually becoming popular on the market. The inertial mouse is more versatile than conventional optical mouse since it can be adapted to operate fluently on all most any type of surface. However, when operating an inertial cursor-control device on a planar surface, the operation of the inertial cursor-control device is usually limited by the size of the surface. That is, when the operating of an inertial cursor-control device brings it to the position near the edge of its operating surface, it is often required to pick up the inertial cursor-control device and put it back to the center of the surface. During the pick-up and put-back period, the inertial sensor of the inertial cursor-control device, such as an accelerometer, is still operative for, detecting the status of the inertial cursor-control device and is subject to the influence of gravity, such that the inertial sensor will pick up unwanted signals and cause the cursor controlled thereby to move disorderly and unexpectedly on the display.

Therefore, what is needed and would be useful is a status sensing mechanism, arranged in a inertial cursor-control device, capable of detecting and determining the operation of the inertial cursor-control device.

SUMMARY OF THE INVENTION

It is the primary object of the present invention to provide a status sensing mechanism, adapted to be applied by an inertial cursor-control device, which is used to detect and determine whether the inertial cursor-control device is supported and operating on the planar surface so as to enable the cursor-control device to act according to the detection for preventing a cursor controlled thereby to move disorderly and unexpectedly on the display.

It is another object of the invention to provide an inertial cursor-control device, which has an evaluation mechanism for detecting and determining whether the inertial cursor-control device is positioned in free space or is supported on a planar surface.

To achieve the above objects, the present invention provide a status sensing mechanism, adapted to be arranged in an inertial cursor-control device capable of receiving and processing an inertial signal while issuing a displacement signal accordingly, which is comprised of: a post; and a sleeve, ensheathing the post for enabling the post to slide up and down therein; wherein the post is abutted against a side of the sleeve as the inertial cursor-control device is subject to a first movement while the post is separated from the side of the sleeve as the inertial cursor-control device is subject to a second movement.

Preferably, the status sensing mechanism further comprises a stopping part, attached to the post, which can be a abutting panel, a block, or a protruding rod.

Preferably, the first movement is enabled as the inertial cursor-control device is supported and operating on the planar surface while the second movement is enabled as the inertial cursor-control device is being picked up and positioned in free space.

Preferably, the status sensing mechanism further comprises a sensing unit for detecting the relative positioning of the post and the sleeve so as to make an evaluation to determine whether the inertial cursor-control device is subjected the first movement or is subjected to the second movement. Moreover, the sensing unit can be an electric sensor, which further comprises: a first electrode plate, arranged on the post; a second electrode, arranged in the sleeve at a position capable of corresponding to the first electrode plate; and a signal processor, coupled to the first and the second electrode plates.

In a preferred embodiment of the invention, an inertial cursor-control device is provided, which comprises: an inertial cursor processor, for receiving and processing an inertial signal while issuing a displacement signal accordingly; a status sensing mechanism, further comprising a post and a sleeve ensheathing the post for enabling the post to slide up and down therein; and a sensing unit, coupled to the inertial cursor processor and the status sensing mechanism, capable of detecting the relative positioning of the post and the sleeve so as to make an evaluation to determine whether the inertial cursor-control device is subjected the first movement or is subjected to the second movement; wherein the post is abutted against a side of the sleeve as the inertial cursor-control device is subject to a first movement while the post is separated from the side of the sleeve as the inertial cursor-control device is subject to a second movement.

Preferably, the inertial signal is comprised of at least two signals detected respectively along two different axes of a space.

Preferably, the inertial cursor processor is enabled to perform a displacement locking operation for freeing the cursor from the control of the cursor-control device while the cursor-control device is subjected to the second movement, and the inertial cursor processor is enabled to perform a calculation upon the inertial signal to issue the displacement signal for directing the cursor to move accordingly while the cursor-control device is subjected to the first movement.

Preferably, the inertial cursor-control device can be adapted to be applied by a device selected from the group consisting of an electronic calculating apparatus, an image displaying apparatus and an image projecting apparatus.

Preferably, the inertial cursor processor is enabled to perform a two-dimensional calculation upon a displacement of the inertial cursor processor operating on the planar surface while the cursor-control device is subjected to the first movement, and the inertial cursor processor is enabled to perform a three-dimensional calculation upon a displacement of the inertial cursor processor operating in free space while the cursor-control device is subjected to the second movement.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
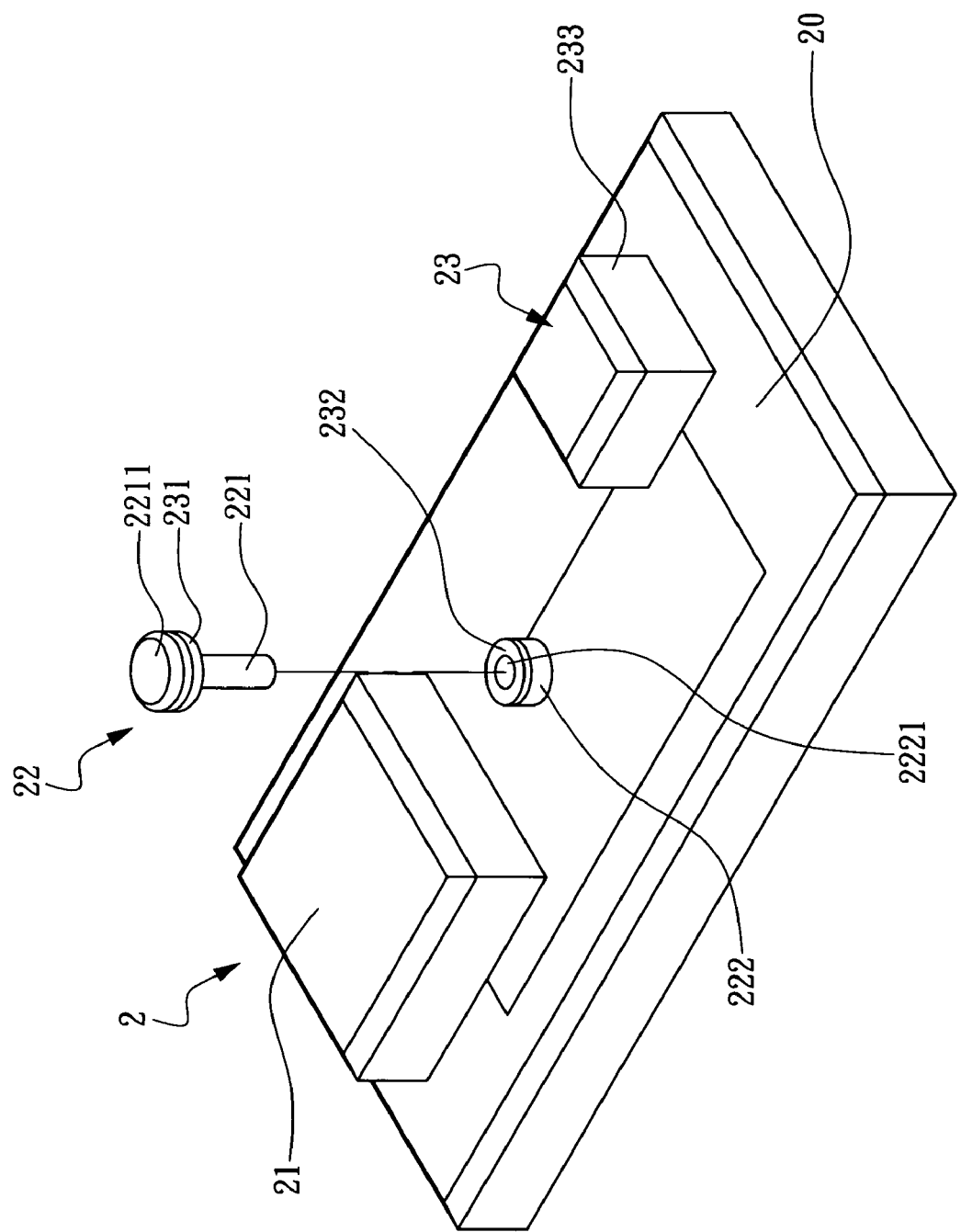
FIG. 1 is a schematic view of an inertial cursor-control device according to a preferred embodiment of the invention.

Please refer to FIG. 1, which is a schematic view of an inertial cursor-control device according to a preferred embodiment of the invention. The inertial cursor-control device 2 comprises an inertial cursor processor 21, a status sensing mechanism 22 and a sensing unit 23. The inertial cursor processor 21 is disposed on a substrate 20 and is used for receiving and processing an inertial signal, caused by a user holding the inertial cursor-control device 2, while issuing a displacement signal accordingly, in which the inertial signal can be a signal of one degree of freedom, or a signal of two degree of freedom, or even a signal of three or more degree of freedom and is detected by inertial sensors such as accelerometer or gyroscope. The displacement signal is processed by the inertial cursor processor 23 so as to be used for controlling the movement of a cursor displayed on a display. The display can be an electronic calculating apparatus like a computer, an image displaying apparatus like a flat panel TV, a LCD TV, or a plasma TV, and an image projecting apparatus, but is not limited thereby.

The status sensing mechanism 22 is also arranged on the substrate 20 and is comprised of a post 221 and a sleeve 222. The sleeve 222 is fixed on the substrate 20 and has a through hole 2221 axially bored from the top to the bottom thereof and all the way through the substrate 20 underneath. The sleeve 222 receives the post 222 in the through hole 2221 thereof while enabling the post 222 to slide up and down therein. In addition, there is a stopping part 2211 being attached to the post 221 by a manner that the stopping part 2211 is enabled to abut against a side of the sleeve 222 as the inertial cursor-control device 2 is subject to a first movement, and the stopping part 2211 is enabled to separate from the side of the sleeve 222 as the inertial cursor-control device 2 is subject to a second movement. In this preferred embodiment, the stopping part is an abutting panel fixed to the top of the post 221. However, except for the abutting panel, the stopping part can be a block, or a protruding rod, but is not limited thereby.

Figure 2A:
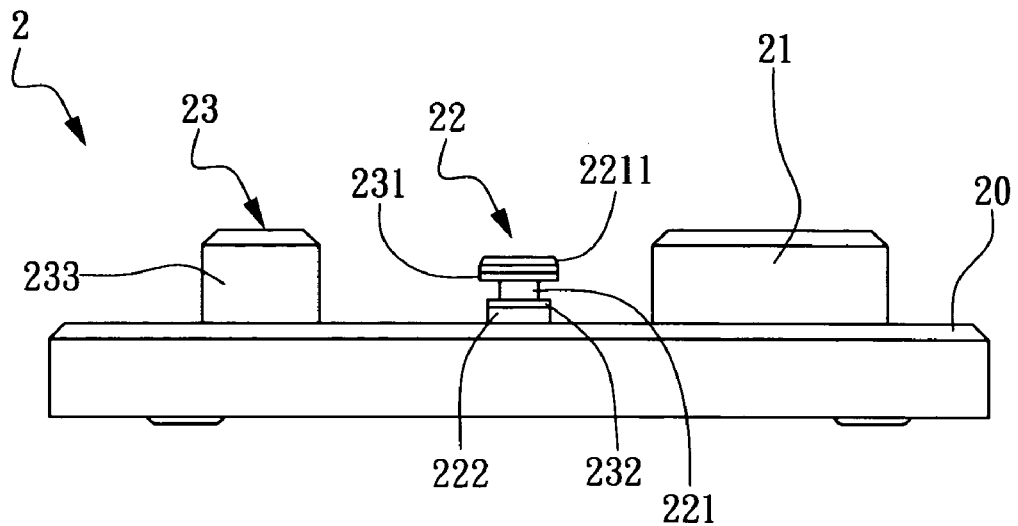
FIG. 2A is a schematic diagram illustrating the status of the status sensing mechanism while the inertial cursor-control device is being placed on a planar surface according to the invention.
Figure 2B:
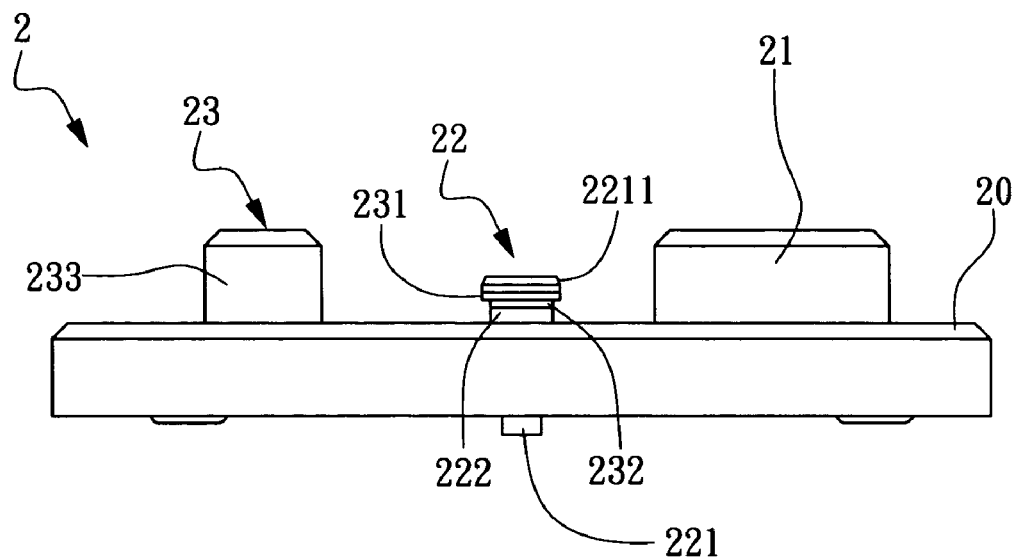
FIG. 2B is a schematic diagram illustrating the status of the status sensing mechanism while the inertial cursor-control device is being picked up and positioned in free space according to the invention.

Please refer to FIG. 2A, which is a schematic diagram illustrating the status of the status sensing mechanism while the inertial cursor-control device is being placed on a planar surface according to the invention. In this preferred embodiment shown in FIG. 2A, the first movement is enabled as the inertial cursor-control device 2 is supported and operating on the planar surface, such as a desk-top. During the first movement is enabled, i.e. as the inertial cursor-control device 2 is placed on a desk-top, the post 22.1 is supported by the desk-top while enabling the stopping part 2211 to be lift form contacting to the sleeve 222. Please refer to FIG. 2B, which is a schematic diagram illustrating the status of the status sensing mechanism while the inertial cursor-control device is being picked up and positioned in free space according to the invention. In this preferred embodiment shown in FIG. 2B, the second movement is enabled as the inertial cursor-control device 2 is being picked up and positioned in free space. During the second movement is enabled, i.e. as the inertial cursor-control device 2 is being picked up, the post 221 is slipping downwardly in the sleeve 222 by action of gravity unit the slipping is stopped by the stopping part 2211 abutting against to the sleeve 222.

As seen in FIG. 1, the sensing unit 23 is coupled to the inertial cursor processor 21 and the status sensing mechanism 22 so that the sensing unit 23 is capable of detecting the relative positioning of the post 221 and the sleeve 222 so as to make an evaluation to determine whether the inertial cursor-control device 2 is subjected the first movement or is subjected to the second movement. Moreover, the sensing unit 23 can be an electric sensor, which further comprises: a first electrode plate 231, attached to a side of the stopping part 2211; a second electrode 232, arranged in the sleeve 222 at a position capable of corresponding to the first electrode plate 231; and a signal processor 233, coupled to the inertial cursor processor 21 and the first and the second electrode plates 231, 232, for transmitting electrical signals to the inertial cursor processor 21.

Figure 4A:
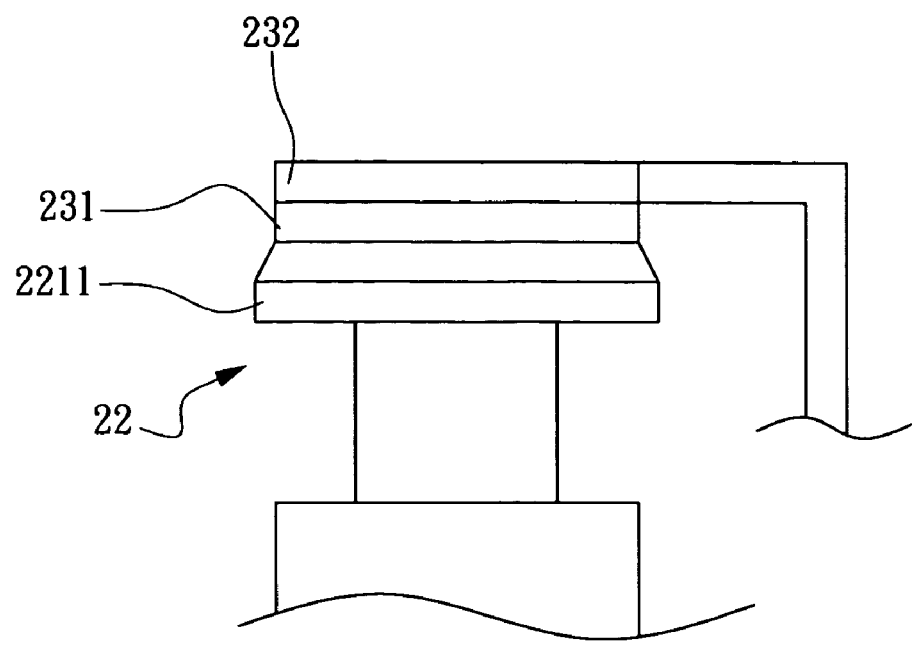
FIG. 4A is a schematic diagram illustrating the status of the status sensing mechanism while the inertial cursor-control device is subjected to the second movement according to a preferred embodiment of the invention.
Figure 4B:
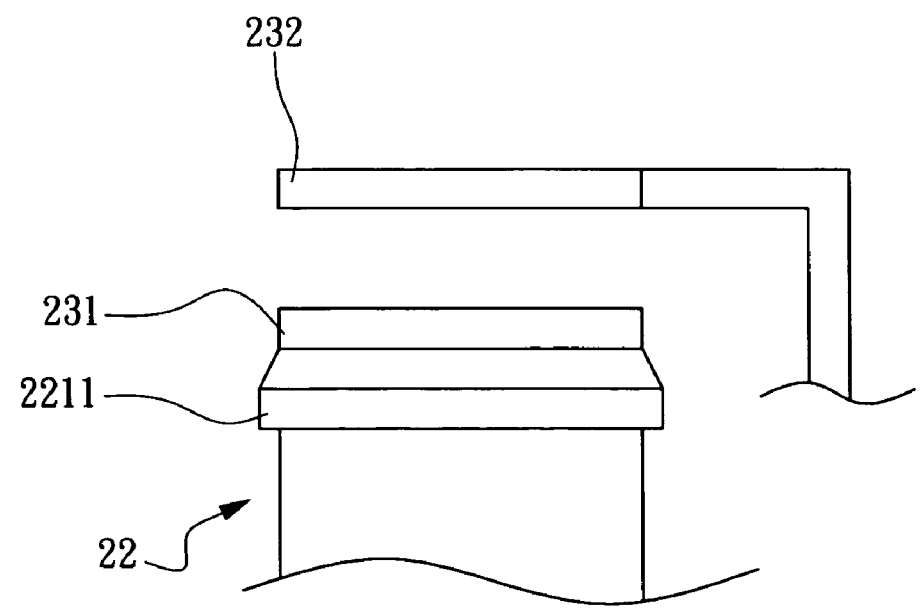
FIG. 4B is a schematic diagram illustrating the status of the status sensing mechanism while the inertial cursor-control device is subjected to the first movement according to a preferred embodiment of the invention.

Except for the arrangement of the first and the second electrode plates 231, 232 shown in FIG. 1, there are other arrangements can be adopted as shown in FIG. 4A and FIG. 4B. As the embodiment shown in FIG. 4A and FIG. 4B, the first electrode plate 231 is arranged on top of the stopping part 2211 while the second electrode plate 232 is arranged over the stopping part 2211 at a position capable of corresponding to the first electrode plate 231. FIG. 4A is a schematic diagram illustrating the status of the status sensing mechanism while the inertial cursor-control device is subjected to the second movement. FIG. 4B is a schematic diagram illustrating the status of the status sensing mechanism while the inertial cursor-control device is subjected to the first movement.

Although the first electrode plate 231 is arranged on top of the stopping part 2211 in the preferred embodiment shown in FIG. 4A and FIG. 4B, it is also feasible to attach the first electrode plate 231 directly on the post 221 while employing the first electrode plate 231 as the stopping part 2211 and thus the disposition of stopping part 2211 on the post 221 can be voided.

Figure 3A:
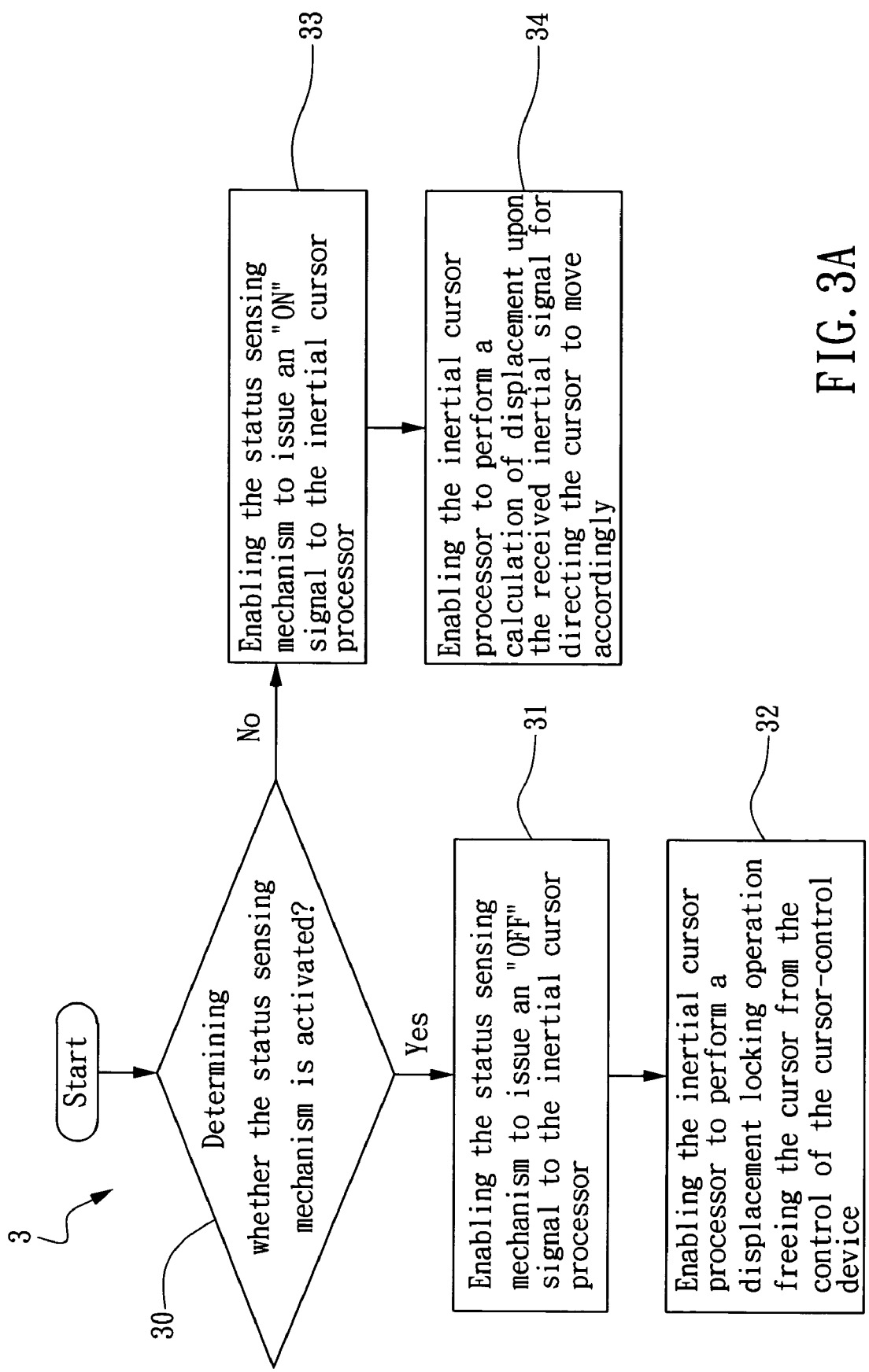
FIG. 3A is a flow chart depicting the operating of a cursor-control device with status sensing mechanism according to a first embodiment of the invention.

Please refer to FIG. 3A, which is a flow chart depicting the operating of a cursor-control device with status sensing mechanism according to a first embodiment of the invention. The flow starts at step 30. In step 30, an evaluation is being made for determining whether the status sensing mechanism 22 is activated; if so, the flow proceeds to step 31; otherwise, the flow proceeds to step 33. That is, the status sensing mechanism 22 is determined to be deactivated as the as the inertial cursor-control device 2 is placed on a desk-top and thus the post 221 is supported by the desk-top while enabling the post 221 to be lift for enabling the first electrode plate 231 to be separated from the second electrode plate 232 by a distance, i.e. a broken circuit is formed between the first electrode plate 231 and the second electrode plate 232; and the status sensing mechanism 22 is determined to be activated as the inertial cursor-control device 2 is being picked up and thus the post 221 is slipping downwardly in the sleeve 222 by action of gravity for enabling the first electrode plate 231 to contact with the second electrode plate 232. In step 33, the status sensing mechanism 22 is enabled to issue an "ON" signal to the inertial cursor processor 21 by the signal processor 233 thereof; and the flow proceeds to step 34. In step 24, the inertial cursor processor 21 is enabled to perform a calculation of displacement upon the received inertial signal and issuing a displacement signal for directing the cursor displayed on a display to move accordingly. In step 31, the status sensing mechanism 22 is enabled to issue an "OFF" signal to the inertial cursor processor 21 by the signal processor 233 thereof; and the flow proceeds to step 32. In step 32, the inertial cursor processor 21 is enabled to perform a displacement locking operation for freeing the cursor from the control of the cursor-control device while registering the cursor's final position.

Figure 3B:
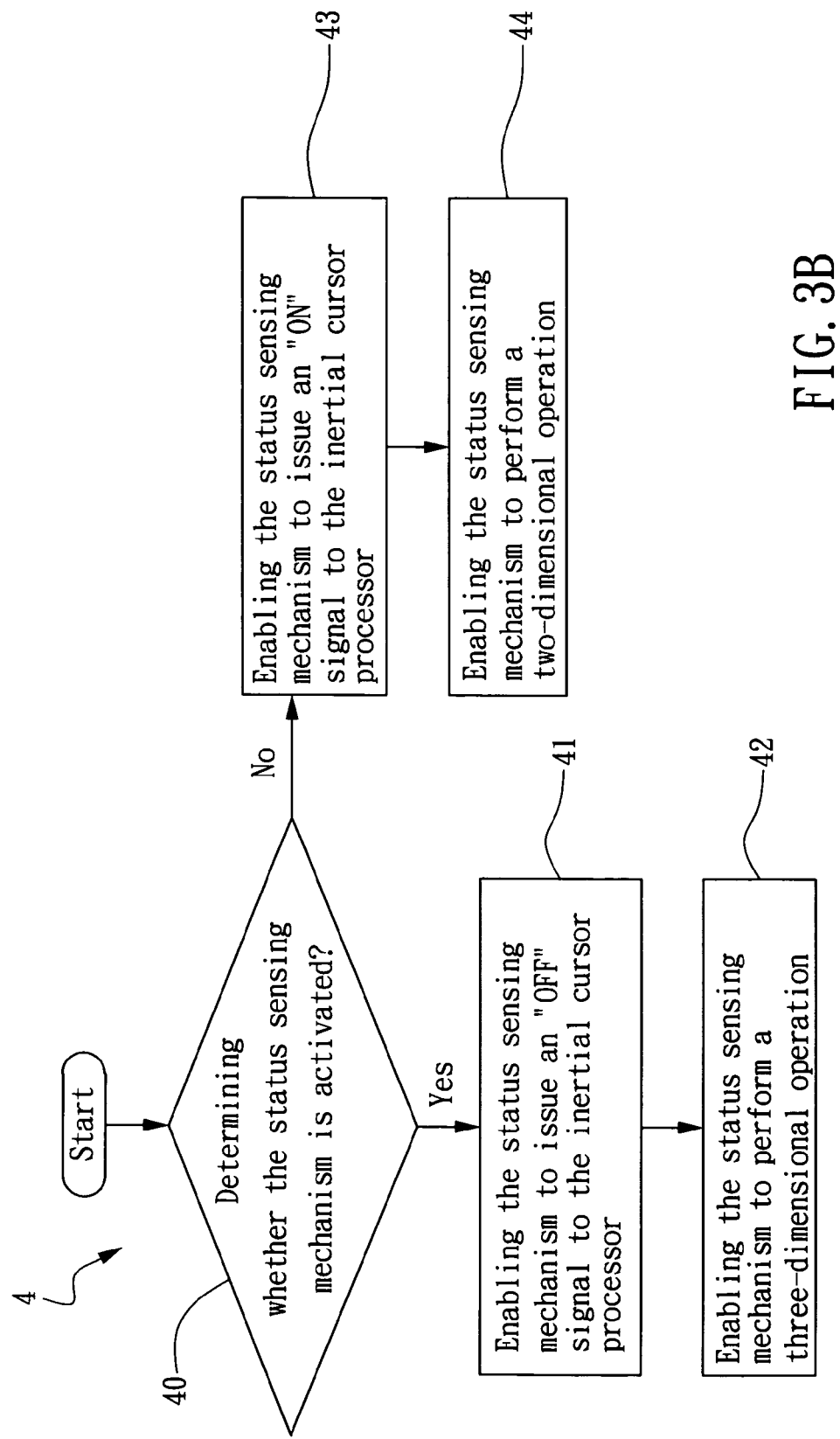
FIG. 3B is a flow chart depicting the operating of a cursor-control device with status sensing mechanism according to a second embodiment of the invention.

Please refer to FIG. 3B, which is a flow chart depicting the operating of a cursor-control device with status sensing mechanism according to a second embodiment of the invention. The flow starts at step 40. In step 40, an evaluation is being made for determining whether the status sensing mechanism 22 is activated; if so, the flow proceeds to step 41; otherwise, the flow proceeds to step 43. That is, the status sensing mechanism 22 is determined to be deactivated as the as the inertial cursor-control device 2 is placed on a desk-top and thus the post 221 is supported by the desk-top while enabling the post 221 to be lift for enabling the first electrode plate 231 to be separated from the second electrode plate 232 by a distance, i.e. a broken circuit is formed between the first electrode plate 231 and the second electrode plate 232; and the status sensing mechanism 22 is determined to be activated as the inertial cursor-control device 2 is being picked up and thus the post 221 is slipping downwardly in the sleeve 222 by action of gravity for enabling the first electrode plate 231 to contact with the second electrode plate 232. In step 43, the status sensing mechanism 22 is enabled to issue an "ON" signal to the inertial cursor processor 21 by the signal processor 233 thereof; and the flow proceeds to step 44. In step 44, the inertial cursor processor is enabled to perform a two-dimensional calculation upon the received inertial signal and issuing a displacement signal for directing the cursor displayed on a display to move accordingly. In step 41, the status sensing mechanism 22 is enabled to issue an "OFF" signal to the inertial cursor processor 21 by the signal processor 233 thereof; and the flow proceeds to step 42. In step 42, the inertial cursor processor 21 is enabled to perform a three-dimensional calculation upon the received inertial signal and issuing a signal of rotation and displacement for directing the cursor displayed on a display to move accordingly. In this preferred embodiment shown in FIG. 3B, the status sensing mechanism 22 is employed as a switch control for controlling the inertial cursor-control device 2 to perform an operation selected from the group consisting of a calculation of two-dimensional displacement and a calculation of three-dimensional displacement.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A status sensing mechanism, adapted to be arranged in an inertial cursor-control device capable of receiving and processing an inertial signal while issuing a displacement signal accordingly, comprising:
    a post;
    a stopping part;
    a sleeve, ensheathing the post for enabling the post to slide up and down therein; wherein the part is separated from the side of the sleeve as the inertial cursor-control device is subject to a first movement, while the stopping part is abutted against a side of the sleeve as the inertial cursor-control device is subject to a second movement; and
    a sensing unit, for detecting the relative positioning of the post and the sleeve so as to make an evaluation to determine whether the inertial cursor-control device is subjected the first movement or is subjected to the second movement, wherein the sensing unit is an electric sensor.

2. The status sensing mechanism of claim 1, further comprising:
    a stopping part, attached to the post.

3. The status sensing mechanism of claim 2, wherein the stopping part is a part selected from the group consisting of a abutting panel, a block, and a protruding rod.

4. The status sensing mechanism of claim 1, wherein the first movement is enabled as the inertial cursor-control device is supported and operating on the planar surface.

5. The status sensing mechanism of claim 1, wherein the second movement is enabled as the inertial cursor-control device is being picked up and positioned in free space.

6. The status sensing mechanism of claim 1, wherein electric sensor, further comprising:
    a first electrode plate, arranged on the post;

a second electrode, arranged in the sleeve at a position capable of corresponding to the first electrode plate; and a signal processor, coupled to the first and the second electrode plates.

7. An inertial cursor-control device, comprising:

an inertial cursor processor, for receiving and processing an inertial signal while issuing a displacement signal accordingly;

a status sensing mechanism, further comprising:

a post;

a stopping part;

a sleeve, ensheathing the post for enabling the post to slide up and down therein; wherein the part is separated from the side of the sleeve as the inertial cursor-control device is subject to a first movement, while the stopping part is abutted against a side of the sleeve as the inertial cursor-control device is subject to a second movement; and a sensing unit, coupled to the inertial cursor processor and the status sensing mechanism, capable of detecting the relative positioning of the post and the sleeve so as to make an evaluation to determine whether the inertial cursor-control device is subjected the first movement or is subjected to the second movement, wherein the sensing unit is an electric sensor.

8. The inertial cursor-control device of claim 7, further comprising:

a stopping part, attached to the post.

9. The inertial cursor-control device of claim 8, wherein the stopping part is a part selected from the group consisting of a abutting panel, a block, and a protruding rod.

10. The inertial cursor-control device of claim 7, wherein the first movement is enabled as the inertial cursor-control device is supported and operating on the planar surface.

11. The inertial cursor-control device of claim 7, wherein the second movement is enabled as the inertial cursor-control device is being picked up and positioned in free space.

12. The inertial cursor-control device of claim 7, wherein electric sensor, further comprising:

a first electrode plate, arranged on the post;

a second electrode, arranged in the sleeve at a position capable of corresponding to the first electrode plate; and a signal processor, coupled to the first and the second electrode plates.

13. The inertial cursor-control device of claim 7, wherein the inertial signal is comprised of at least two signals detected respectively along two different axes of a space.

14. The inertial cursor-control device of claim 7, wherein the inertial cursor processor is enabled to perform a calculation upon the inertial signal to issue the displacement signal for directing a cursor to move accordingly while the inertial cursor-control device is subjected to the first movement.

15. The inertial cursor-control device of claim 7, wherein the inertial cursor processor is enabled to perform a displacement locking operation for freeing a cursor from the control of the cursor-control device while the inertial cursor-control device is subjected to the second movement.

16. The inertial cursor-control device of claim 7, wherein the inertial cursor-control device can be adapted to be applied by a device selected from the group consisting of an electronic calculating apparatus, an image displaying apparatus and an image projecting apparatus.

17. The inertial cursor-control device of claim 7, wherein the inertial cursor processor is enabled perform a two-dimensional calculation for issuing the displacement signal with respect to the movement of the inertial cursor processor operating on the planar surface as the inertial cursor-control device is subjected to the first movement.

18. The inertial cursor-control device of claim 7, wherein the inertial cursor processor is enabled to perform a three-dimensional calculation for issuing the displacement signal with respect to the movement of the inertial cursor processor operating in the free space as the inertial cursor-control device is subjected to the second movement.

* * * * *